Nov. 11, 1952     A. H. BOHREN     2,617,442
ROTARY PLUG WALL VALVE
Filed April 4, 1949

INVENTOR.
Arthur H Bohren
BY
Buckhorn and Cheatham
Attorneys

Patented Nov. 11, 1952

2,617,442

UNITED STATES PATENT OFFICE 2,617,442

ROTARY PLUG WALL VALVE

Arthur H. Bohren, Portland, Oreg.

Application April 4, 1949, Serial No. 85,297

1 Claim. (Cl. 137—360)

The present invention relates to valves and more particularly to valves of the interwall mounting type.

Frequently it is desirable, such as for use in hot water radiant heating systems for dwelling houses, to mount a valve between the walls for controlling fluid flow through different portions of the system. Valves as heretofore manufactured have not been suitable for such installations for various reasons. It is not only difficult to mount conventional valves behind walls, but also they cannot be mounted without the stem neck portion projecting in an unsightly manner from the wall surface.

It is the principal object, therefore, of the present invention to provide a new and improved valve adapted primarily for mounting behind a wall and with only a minimum portion thereof projecting beyond the wall surface.

A further object of the present invention is to provide a new and improved mounting arrangement for a valve of the class described.

A further object is to provide a valve of the class described having a relatively long neck whereby the connected tube is supported at a safe distance behind the wall.

A still further object of the present invention is to provide a valve consisting of a minimum number of parts of simple design and capable of low cost manufacture.

Further objects and advantages of the present invention will become apparent as the description proceeds while the features of novelty will be pointed out with greater particularity in the appended claim.

Figure 1:
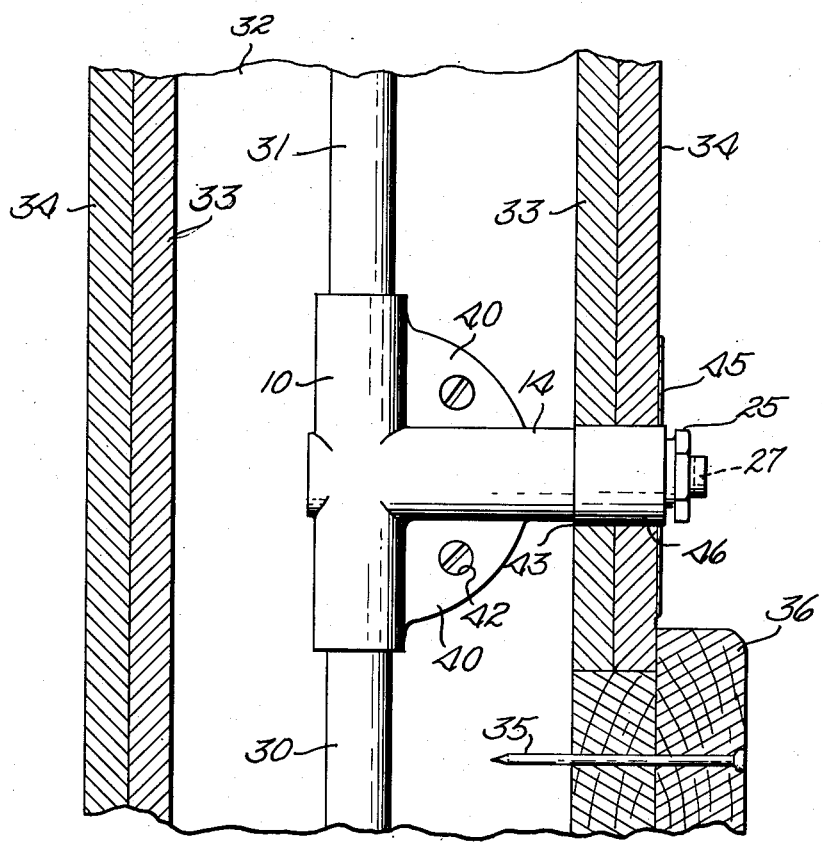
Figure 2:
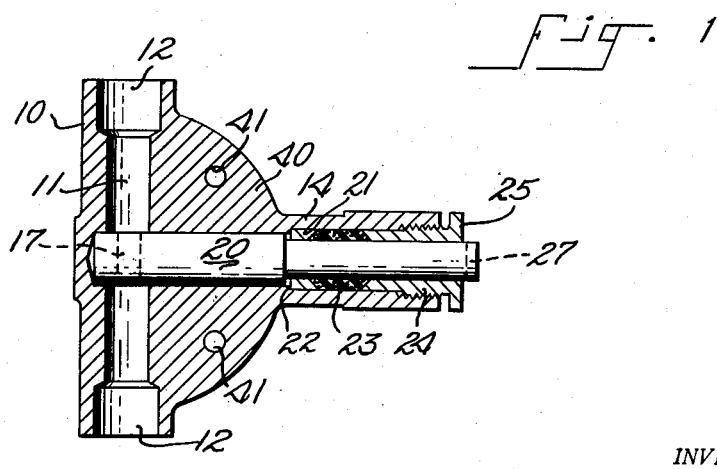

In the drawings, Fig. 1 is a view illustrating a valve constructed in accordance with one form of the present invention and shown in a typical installation; and Fig. 2 is a longitudinal cross-sectional view through the valve shown in Fig. 1.

The valve as shown comprises an elongated body portion 10 having a fluid passage 11 extending longitudinally therethrough, there being conduit connection means formed in the body at the opposite ends of the passage 11. As shown, these connection means consist of enlarged sockets 12 adapted for receiving ends of tubes to be sweated therein with solder. Obviously, the sockets may be threaded for receiving threaded pipe ends if desired. An elongated neck portion 14 extends from one side of the body portion 10 substantially at right angles therefrom and is provided with a bore extending longitudinally therethrough, the inner end of the bore intersecting the fluid passage 11. A rotatably adjustable valve member 16 of cylindrical configuration is arranged within the bore, the inner end of the valve member being provided with a transverse port 17 which, in one angular position of the valve member, provides communication between the portions of the fluid passage 11 on the opposite sides thereof. Upon rotation of the valve member, the port openings communicating with the passage 11 may be throttled so as to adjust the fluid flow through the valve as may be desired. The valve member 16 fits with a relatively close tolerance within the bore so that only a negligible leakage, if any, can occur past the valve member when the same is moved to the fully closed position, that is, with the port 17 extending at right angles to the direction of the passage 11. It is to be understood that the present valve is intended primarily for throttling purposes and hence it is not essential that it be capable of fluid tight control of the valve passage.

The valve member 16 also includes a stem portion 20 of reduced diameter and upon which is arranged a metal collar 21, the peripheral edge of which is adapted to seat against the narrow shoulder 22 formed within the bore of the valve neck adjacent the inner end of the stem portion 20. A sealing gasket 23 is also arranged about the stem 20 and which is adapted to be compressed against the collar 21 by the gland nut 24 cooperatively threaded within the inner wall of the bore, the gland nut being provided with an enlarged hex head 25. The outer end of the stem 20 is provided with a tool engaging slot 27 whereby the valve member 16 may be rotated for effecting adjustment thereof.

In Fig. 1, the valve is shown in a typical installation for which the valve is intended, that is, in a radiant heating system. In such systems, the heated water is usually conducted upwardly between the partition walls of the dwelling through copper tubing, lengths 30 and 31 being shown connected to opposite ends of the valve body. Because of the fact that copper tubing is relatively soft, it may be punctured by nails which may be driven into the wall by the occupant without knowledge of the tubing therebehind. Accidental puncturing of the tubing results in serious damage to the walls due to water leakage, and the repairs necessitated are costly. It is important, therefore, that the copper tubing be supported a safe distance from the outer surface of the wall so that it cannot be reached by nails driven into the wall. A typical partition wall section is shown in Fig. 1 consisting of a vertical studding 32, usually 2 x 4's, layers of lath 33, and outer layers of plaster 34. The over-all wall thickness varies ordinarily from 4 to 6 inches with the average being about 5 inches. The length of the valve neck 14 as measured from the axis of the passage 11 is preferably, therefore, between 2 and 3 inches whereby the tubing connected to the valve will be supported in a substantially centered relation with respect to the wall section when the outer end of the valve neck is arranged substantially flush with the outer wall surface. The tubing is thereby supported beyond the reach of ordinary length nails such as that shown at 35 securing a baseboard 36 in place.

It is essential that the valve be substantially rigidly anchored to a support means and, ordinarily, the valve of the present invention may be conveniently fastened directly against the studding. It will be understood that, unless the valve is securely anchored in place, upon application of a tool or wrench to the valve stem, chipping of the plaster surrounding the valve neck may occur. In order to facilitate anchorage of the valve, I provide triangularly shaped web portions 40 in the opposite corners between the body and neck portions of the valve, holes 41 being provided through these web portions for cooperatively receiving screws 42 or other fastening means.

The installation is usually made prior to the time that the lath and plaster are applied over the studding; and, in order to gauge the proper extent of the projection for the neck portion of the valve from the side edge of the studding, I provide a suitable marking such as a bead 43 approximately three-fourths of an inch from the outermost end of the neck. This bead may, for example, be formed by providing a slight enlargement for the outer end of the neck portion as shown at 46 and which I prefer to machine smoothly to cylindrical shape in order that, if desired, an escutcheon plate 45 may be mounted around the valve end after the plaster has been applied over the lathing. An important feature of the invention is that the outer diameter of the neck portion 14 behind the shoulder or bead 43 be the same as that of the body portion 10 so that the T-shaped valve structure will lie flat against the studding with the axis of the stem extending parallel therewith. Also the holes 41 in the webs 40 should lie inside of a line drawn between the points of contact of the extremities of the neck and body portions so that neither of the fastening screws will tend to rock the valve structure out of the desired parallel alignment with the studding surface.

It will be obvious from the description given that the valve of the present invention is of simple design and consists of relatively few parts which may be assembled at low cost. When properly installed, the connected tubing is supported a safe distance within the partition walls while only a minimum portion of the valve projects from the outer surface of the wall. Since the gland nut 25 is threaded internally in the neck bore, the valve may be readily dismantled for servicing without requiring removal of any plaster.

Having described the invention in what I consider to be a preferred embodiment, it is desired that it be understood that the specific details shown and described are merely illustrative and that it is intended in the following claim to cover all such forms and variations as fall within the true spirit and scope of the invention.

I claim:

A radiant heating system regulating valve adapted particularly for mounting against an interwall stud and for supporting the connected tubing substantially in the plane of the center line of the studding, said valve comprising an elongated body having a fluid passage extending longitudinally therethrough, said body including conduit connection means at the opposite ends of said passage, an elongated neck integral with and extending substantially at right angles of one side of said body, a bore extending through said neck and intersecting said passage, an adjustable valve stem arranged in said bore for controlling fluidflow through said passage, a gland nut surrounding said stem and threaded internally in the outer end portion of said bore, webs in the opposite corners between said neck and said body, openings through said webs inside of a line between extremities of said neck and said body for receiving means for fastening said valve to a stud surface, said neck and said body having the same maximum outside diameters whereby said valve will lie flat against the stud surface and with said stem extending parallel with said stud surface, a cylindrical extension of said neck being of slightly larger diameter than the remainder of said neck and defining a shoulder, said extension having a predetermined length corresponding to a predetermined wall layer thickness whereby when said valve is secured against a stud with said shoulder engaging against an edge of said stud, said neck extension will project outwardly from said stud by an amount corresponding substantially to the thickness of the wall layer.

ARTHUR H. BOHREN.

REFERENCES CITED

The following references are of record in the file of this patent:

UNITED STATES PATENTS

| Number | Name | Date |
|---|---|---|
| 866,285 | Klie | Sept. 17, 1907 |
| 1,115,696 | Linbarger | Nov. 3, 1914 |
| 1,844,046 | Sheets | Feb. 9, 1932 |
| 1,895,636 | McKaig | Jan. 31, 1933 |
| 1,906,313 | Clifford | May 2, 1933 |